United States Patent [19]

Nakayama et al.

[11] Patent Number: 4,745,031
[45] Date of Patent: * May 17, 1988

[54] MAGNETIC RECORDING MEDIUM

[75] Inventors: Masatoshi Nakayama; Haruyuki Morita; Yuichi Kubota; Keiko Tsuchiya, all of Tokyo, Japan

[73] Assignee: TDK Corporation, Tokyo, Japan

[*] Notice: The portion of the term of this patent subsequent to Mar. 11, 2003 has been disclaimed.

[21] Appl. No.: 813,639

[22] Filed: Dec. 26, 1985

[30] Foreign Application Priority Data

Dec. 30, 1984 [JP] Japan ............................ 59-281046

[51] Int. Cl.⁴ ............................................. G11B 5/704
[52] U.S. Cl. ........................................ 428/433; 427/39;
427/128; 427/131; 428/426; 428/446; 428/457;
428/694; 428/611; 428/678; 428/900; 428/928
[58] Field of Search .................. 427/129, 41, 128, 131,
427/39, 40, 132; 428/611, 678, 928, 900, 694,
426, 457, 446, 433; 360/134–136

[56] References Cited

U.S. PATENT DOCUMENTS

| 4,250,225 | 2/1981 | Shirahata | 427/129 |
| 4,419,381 | 12/1983 | Yamazaki | 427/129 |
| 4,419,404 | 12/1983 | Arai | 427/41 |
| 4,526,806 | 7/1985 | Haque | 427/41 |
| 4,543,268 | 9/1985 | Sidney | 427/129 |
| 4,548,864 | 10/1985 | Nakayama | 428/336 |
| 4,551,778 | 11/1985 | Arai | 427/41 |
| 4,565,734 | 1/1986 | Arai | 427/41 |
| 4,575,475 | 3/1986 | Nakayama | 428/480 |
| 4,582,746 | 4/1986 | Shirahata | 427/41 |
| 4,594,262 | 6/1986 | Kreil | 427/44 |
| 4,699,847 | 10/1987 | Nakayama | 427/44 |

Primary Examiner—Ellis P. Robinson
Attorney, Agent, or Firm—Oblon, Fisher, Spivak, McClelland & Maier

[57] ABSTRACT

In a magnetic recording medium of the hard disk type comprising a rigid substrate and a magnetic layer formed thereon, the substrate is plasma treated at frequencies in the range of 10 to 200 kHz in an inorganic gas containing O; N and H; and N, H and O.

8 Claims, 1 Drawing Sheet

MAGNETIC RECORDING MEDIUM

BACKGROUND OF THE INVENTION

This invention relates to magnetic recording media, and more particularly, to magnetic recording media having a rigid substrate plasma treated for improved bonding of a magnetic layer.

Several decades have passed since the appearance of megnetic recording media comprising a nonmagnetic substrate and a magnetic layer formed from a magnetic powder of oxide type such as gamma-$Fe_2O_3$ and cobalt-containing gamma-$Fe_3O_4$ and a binder. Recently, for the purpose of further improving recording density, magnetic recording media comprising a magnetic layer formed from a ferromagnetic powder such as Fe, Co, Ni, Fe-Co, Co-Ni, Fe-Co-Ni, Fe-Co-B, Fe-Co-Cr-B, Mn-Bi, MnAl, Fe-Co-V, etc. and a binder were developed and are now of great interest in the art.

Among these magnetic recording media there are known magnetic disks of the so-called hard disk type having a rigid substrate such as a metal substrate. The hard disks should have a high bond strength between their magnetic layer and substrate. The surface treatment of rigid substrates by any conventional process, for example, by corona discharge is not successful in achieving a sufficient bond strength.

SUMMARY OF THE INVENTION

A primary object of the present invention is to provide a new and improved magnetic recording medium comprising a plasma treated substrate and a magnetic layer formed thereon whereby the substrate-magnetic layer bond strength is significantly increased.

The present invention is concerned with a magnetic recording medium comprising a rigid substrate and a magnetic layer formed on the substrate. According to the present invention, the rigid substrate is previously plasma treated in an atmosphere consisting essentially of an inorganic gas. The magnetic layer may be formed on the substrate directly or via an undercoat layer. The plasma treatment is preferably conducted at a frequency of 10 kHz to 200 kHz in an atmosphere of an inorganic gas containing nitrogen, hydrogen and more preferably, an effective amount of oxygen.

BRIEF DESCRIPTION OF THE DRAWING

The above and other objects, features, and advantages of the persent invention will be more readily understood by reading the following description taken in conjunction with the accompanying drawings, in which.

DETAILED DESCRIPTION OF THE INVENTION

Figure 1:
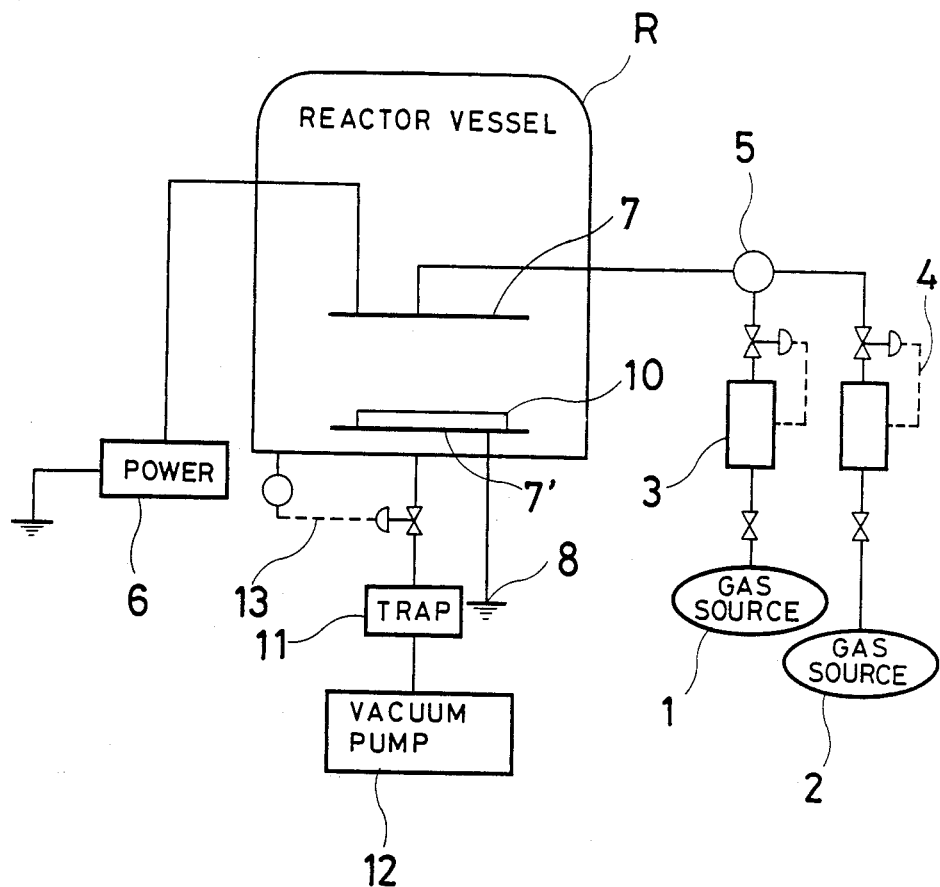
FIG. 1 is a schematic illustration of a plasma treating apparatus having a variable frequency power source.

The rigid substrates of the magnetic recording medium of the present invention are formed of any suitable rigid materials, for example, a metal such as polished aluminum, hard glass, and ceramics. The substrates of such rigid inorganic material are not particularly limited in shape, size, and thickness as long as they meet the intended application.

According to the present invention, the substrate is plasma treated on at least one surface which is to bear a magnetic layer. The plasma treatment is effected by feeding an inorganic gas as the treating gas, ionizing it, and contacting the gas-discharge plasma with a rigid substrate of metal, for example, thereby plasma treating the substrate surface.

The plasma treatment can reduce the contact angle of the substrate surface. When a magnetic layer is formed on such a plasma treated substrate surface directly or via an undercoat layer, the bond strength of the magnetic layer is significantly improved. Then the resulting magnetic recording medium is improved in durability or runnability.

The principle of plasma treatment will be briefly described. When an electric field is applied to a gas kept at a reduced pressure, free electrons which are present in a minor proportion in the gas and have a remarkably greater intermolecular distance than under atmospheric pressure are accelerated under the electric field to gain a kinetic energy (electron temperature) of 5 to 10 eV. These accelerated electrons collide against atoms and molecules to fracture their atomic and molecular orbitals to thereby dissociate them into normally unstable chemical species such as electrons, ions, neutral radicals, etc. The dissociated electrons are again accelerated under the electric field to dissociate further atoms and molecules. This chain reaction causes the gas to be instantaneously converted into highly ionized state. This is generally called a plasma. Since gaseous molecules have a less chance of collision with electrons and absorb little energy, they are kept at a temperature approximate to room temperature. Such a system in which the kinetic energy (electron temperature) of electrons and the thermal motion (gas temperature) of molecules are not correlated is designated a low temperature plasma. In this system, chemical species set up the state capable of additive chemical reaction such as polymerization while being kept relatively unchanged from the original. Substrates are plasma treated under these conditions according to the present invention. The use of a low temperature plasma avoids any thermal influence on substrates.

FIG. 1 illustrates a typical apparatus in which a substrate on its surface is treated with a plasma. This plasma apparatus uses a variable frequency power source. The apparatus comprises a reactor vessel R into which a treating gas or gases are introduced from a source 1 and/or 2 through a mass flow controller 3 and/or 4. When desired, different gases from the sources 1 and 2 may be mixed in a mixer 5 to introduce a gas mixture into the reactor vessel. The treating gases each may be fed at a flow rate of 1 to 250 ml per minute.

Disposed in the reactor vessel R are a pair of opposed electrodes 7 and 7'. One electrode 7 is connected to a variable frequency power source 6 and the other electrode 7' grounded at 8.

A substrate 10 to be treated is supported on the electrode 7 in the reactor vessel R. If desired, continuous operation can be made by continuously moving a length of substrate along the electrode 7.

The reactor vessel R is further connected to a vacuum system for evacuating the vessel, including a liquefied nitrogen trap 11, a vacuum pump 12, and a vacuum controller 13. The vacuum system has the capacity of evacuating and keeping the reactor vessel R at a vacuum of 0.01 to 10 Torr.

In operation, the reactor vessel R is first evacuated by means of the vacuum pump 12 to a vacuum of $10^{-3}$ Torr or lower before a treating gas or gases are fed into the vessel at a given flow rate. Then the interior of the reactor vessel is maintained at a vacuum of 0.01 to 10 Torr. When the flow rate of the treating gas mixture and the rate of transfer of the substrate in the case of continuous operation become constant, the variable frequency power 6 is turned on to generate a plasma with which the substrate is treated.

In this plasma treatment, the power source must have a frequency in the range of 10 to 200 kilohertz. Frequencies lower than 10 kHz and higher than 200 kHz result in a drastic reduction in bond strength, and hence, durability imparted to magnetic recording media. It is to be noted that other parameters including supply current and treating time may be as usual or properly selected without undue experimentation.

According to the present invention, the treating atmosphere used in the plasma treatment is an inorganic gas containing oxygen (O), an inorganic gas containing nitrogen (N) and hydrogen (H), or an inorganic gas containing nitrogen (N), hydrogen (H), and oxygen (O).

The inorganic gas may be suitably selected from $N_2$, $H_2$, $NH_3$, $O_2$, $O_3$, $H_2O$, and $NO_x$ including NO, $N_2O$, and $NO_2$, and mixtures thereof. When the inorganic gas contains oxygen, its $O_2$ content is preferably 5% by volume or higher. When the inorganic gas contains N, H, and optionally O, it preferably has an N content of 5 to 80 at %, an H content of 5 to 80 at %, and an O content of 0 to 50 at %. Outside this range the present invention is less effective.

In addition to the N-, H- and O-bearing gases mentioned above, the inorganic gas used may contain another gas which is selected from Ar, Ne, He and other rare gases and mixtures of two or more.

When the inorganic gas contains N and H, the presence of an active $NH_2$ group on the plasma-treated surface is observed in a spot test on the surface according to the procedure described in F. Feigl, "Spot Test in Organic Analysis", Kyoritsu Publishing K.K., Tokyo, 1958. When the inorganic gas contains O, the plasma-treated surface is observed to have an increased oxide layer by the Auger analysis.

On the thus plasma-treated surface of a rigid substrate of metal or another rigid material, a variety of magnetic layers may be formed. One typical magnetic layer is prepared by applying onto the surface a magnetic coating composition containing magnetic powder, a binder, an organic solvent, and any necessary components followed by drying. The magnetic powder used herein may be any conventional magnetic powder, for example, gamma-$Fe_2O_3$, $Fe_3O_4$, Co-containing gamma-$Fe_2O_3$, Cocontaining $Fe_3O_4$, Fe, or the like. No particular limitation is imposed on the binder.

The magnetic layer may be formed on the plasma-treated surface of the substrate either directly or via an intermediate or undercoat layer. The undercoat layer may be prepared by depositing an alloy of aluminum, copper, titanium, chromium or the like by ion plating, vacuum depositing, sputtering or any suitable technique. The undercoat layer may be formed by coating a resin composition which may contain inorganic fine particulates for their usual purposes, if desired.

The magnetic recording medium of the present invention may find a variety of uses. It is characterized by substantially improved durability or runnability due to the drastically increased bond strength between the substrate and the magnetic layer irrespective of whether or not an undercoat layer is interposed therebetween.

EXAMPLES

Examples of the present invention are given below by way of illustration and not by way of limitation.

EXAMPLE 1

Aluminum substrates having a diameter of 5 inches were polished on the surface. They were plasma treated using as the treating atmosphere different gas mixtures as shown below under Treatments 1–7 and 8–10.

TREATMENT 1

Treating gas: gas mixture of 1/1 $O_2$/Ar
Gas flow rate: 50 ml/min.
Vacuum: 0.05 Torr
Power frequency: 50 kHz

TREATMENT 2

Treating gas: gas mixture of 5/5/1 $NH_3$/$H_2$/Ar
Gas flow rate: 100 ml/min.
Vacuum: 0.1 Torr
Power frequency: 100 kHz

TREATMENT 3

Treating gas: gas mixture of 1/1 $NH_3$/$NO_2$
Gas flow rate: 50 ml/min.
Vacuum: 0.05 Torr
Power frequency: 150 kHz

TREATMENT 4

The conditions used were the same as those of Treatment 1 except that an AC power source was used.

TREATMENT 5

The conditions used were the same as those of Treatment 1 except that the power frequency was 13.56 MHz which is a typical radio frequency.

TREATMENT 6

The conditions used were the same as those of Treatment 2 except that a DC power source was used.

TREATMENT 7

The conditions used were the same as those of Treatment 2 except that the power frequency was 1 MHz.

TREATMENT 8

The conditions used were the same as those of Treatment 1 except that the treating gas was Ar.

TREATMENT 9

The conditions used were the same as those of Treatment 4 except that the treating gas was Ar.

TREATMENT 10

The conditions used were the same as those of Treatment 5 except that the treating gas was Ar.

The plasma-treated surface of the substrates was determined for contact angle by the test described hereinafter.

Magnetic layers were formed on the thus treated substrates by the method shown below, producing magnetic disks.

| Ingredients | Parts by weight |
| --- | --- |
| Fe—Co alloy powder | 100 |
| Abrasive ($Al_2O_3$) | 3 |

| Ingredients | Parts by weight |
| --- | --- |
| Nitrocellulose | 6 |
| Epoxy resin (Epikote ® 1004) | 4 |
| Polyurethane (Nippolan ® 5033) | 10 |
| Solvent | 250 |

The mixture was milled for dispersion for 5 hours in a sand mill, to which 4 parts by weight of an isocyanate (Colonate L) was added. The composition was applied onto the substrates by a conventional coating technique while magnetic orientation was effected.

The resulting magnetic recording disks were examined for bond strength by the following test.

A. Bond strength

An adhesive tape was attached to the magnetic layer of each magnetic recording disc under a predetermined pressure. The adhesive tape was then pulled in a direction at an angle of 180° with respect to the original surface at a given rate. The force required to peel off the adhesive tape was measured.

B. Contact angle

The contact angle of the plasma-treated surface of the substrates was determined by the water drop projection method using a contact angle meter of CA-P type (manufactured by Kyowa Chemical K.K., Japan).

The results are shown in Table 1.

TABLE 1

| Sample No. | Substrate surface treatment | Bond strength (gram) | Contact angle (°) |
| --- | --- | --- | --- |
| 1 | treatment 1 | 260 | 12 |
| 2 | treatment 2 | 250 | 15 |
| 3 | treatment 3 | 280 | 11 |
| 4 | treatment 4 | 200 | 20 |
| 5 | treatment 5 | 205 | 22 |
| 6 | treatment 6 | 210 | 20 |
| 7 | treatment 7 | 205 | 24 |
| 8 | treatment 8 | 170 | 25 |
| 9 | treatment 9 | 165 | 24 |
| 10 | treatment 10 | 160 | 26 |
| 11 | no treatment | 150 | 28 |

The data in Table 1 illustrate that the contact angle of an aluminum substrate is reduced by the plasma treatment according to the present invention particularly when the substrate is plasma treated at a frequency of 10 to 200 kHz in an atmosphere of an inorganic gas containing O; N and H; and N, H and O. The bond strength increases in substantial proportion to a reduction of contact angle.

Although the plasma treatment of an aluminum substrate was illustrated in the example, similar results will be obtained for another rigid substrate and another magnetic layer.

We claim:
1. A magnetic recording medium, comprising:
   a rigid substrate of a material selected from the group consisting of metal, hard glass and ceramics which has been plasma treated at a frequency of 10 kHz to 200 kHz in an atmosphere consisting essentially of an inorganic gas; and
   a magnetic layer formed on said substrate, wherein saids inorganic gas is a member selected from the group consisting of $N_2$, $H_2$, $NH_3$, $O_2$, $O_3$, $H_2O$, $NO_x$ and mixtures thereof.
2. The magnetic recording medium of claim 1, which further comprises an undercoat layer positioned between said substrate and said magnetic layer.
3. The magnetic recording medium of claim 2, wherein said undercoat layer is formed of an alloy of aluminum, copper, titanium or chromium.
4. The magnetic recording medium of claim 1, wherein the plasma treatment of said rigid substrate occurs at a flow rate of inorganic gas of from 1 to 250 ml per minute.
5. The magnetic recording medium of claim 1, wherein the pressure within the plasma generation vessel is within the range of 0.01 to 10 torr.
6. The magnetic recording medium of claim 1, wherein the inorganic gas contains $O_2$ in an amount of at least 5% by volume.
7. The magnetic recording medium of claim 1, wherein said inorganic gas contains from 5 to 80 at % N from 5 to 80 at % H and from 0 to 50 at % O.
8. The magnetic recording medium of claim 1, wherein said rigid substrate is a metal substrate.

* * * * *

UNITED STATES PATENT AND TRADEMARK OFFICE
CERTIFICATE OF CORRECTION

PATENT NO. : 4,745,031

DATED : May 17, 1988

INVENTOR(S) : MASATOSHI NAKAYAMA ET AL

It is certified that error appears in the above-identified patent and that said Letters Patent is hereby corrected as shown below:

Column 6, line 27, change "saids" to --said--.

Signed and Sealed this

Eighth Day of August, 1989

Attest:

DONALD J. QUIGG

Attesting Officer

Commissioner of Patents and Trademarks